US006529723B1

(12) United States Patent
Bentley

(10) Patent No.: US 6,529,723 B1
(45) Date of Patent: Mar. 4, 2003

(54) AUTOMATED USER NOTIFICATION SYSTEM

(75) Inventor: Rick Bentley, San Francisco, CA (US)

(73) Assignee: Televoke, Inc., San Francisco, CA (US)

( * ) Notice: Subject to any disclaimer, the term of this patent is extended or adjusted under 35 U.S.C. 154(b) by 0 days.

(21) Appl. No.: 09/347,389

(22) Filed: Jul. 6, 1999

(51) Int. Cl.[7] .............................................. H04M 15/00
(52) U.S. Cl. ....................... 455/405; 455/410; 455/457; 455/346; 340/573.1
(58) Field of Search ................................ 455/405, 404, 455/410, 423, 38.4, 456, 457, 425, 466, 517, 671, 345, 346; 342/357.01, 5.61, 5.62, 5.63; 340/426, 5.72, 539, 427, 428, 573.1, 537.4; 701/29, 45, 49

(56) References Cited

U.S. PATENT DOCUMENTS

| 4,584,569 A | 4/1986 | Lopez et al. ................ 340/566 |
| 4,794,368 A | 12/1988 | Grossheim et al. ......... 340/528 |
| 4,897,630 A | 1/1990 | Nykerk ....................... 340/426 |

(List continued on next page.)

OTHER PUBLICATIONS

"Where in the World . . . , Part 1: GPS Introduction", Circuit Cellar (Aug. 1999).
OnStar. Automatic Notification of Air Bag Deployment [online], [retrieved on Jun. 15, 1999]. Retrieved from the Internet <URL: http://onstar.com/action/airbag.htm>.
OnStar. OnStar in Action [online], [retrieved on Jun. 15, 1999]. Retrieved from the Internet <URL:http://onstar.com/action/index.htm>.
OnStar. Remote Door Unlock [online], [retrieved on Jun. 15, 1999]. Retrieved from the Internet <URL:http://www.onstar.com/action/unlock.htm>.
OnStar: Theft Protection [online], [retrieved on Jun. 15, 1999]. Retrieved from the Internet <URL:http://onstar.com/action/theft.htm>.
OnStar: Emergency Services [online], [retrieved on Jun. 15, 1999], Retrieved from the Internet <URL:http://onstar.com/action/emergency.htm>.
Internet Resources Group. Enhanced Services [online], [retrieved on Oct. 26, 1999]. Retrieved from the Internet <URL:http://www.redalert.com/enhanced_services.html>.
Internet Resources Group. Error Logs [online], [retrieved on Oct. 26, 1999]. Retrieved from the Internet <URL:http://www.redalert.com/error_logs.html>.
Internet Resources Group. Error Conditions Detected [online], [retrieved on Oct. 26, 1999]. Retrieved from the Internet <URL:http://www.redalert.com/error_conditions.html>.

(List continued on next page.)

Primary Examiner—Lester G. Kincaid
Assistant Examiner—Naghmeh Mehrpour
(74) Attorney, Agent, or Firm—Bingham McCutchen LLP; David G. Beck

(57) ABSTRACT

The present invention provides an automated user notification system for monitoring user items and notifying a user when selected conditions occur. A first portion of the notification system comprises a network operations center (NOC). The NOC stores user information about one or more user items and is further coupled to a plurality of communication devices that can automatically contact a user. A second portion of the notification system comprises at least one detector. The detector monitors one or more user items and provides information regarding selected conditions of the user items to the NOC via a communication link. When the information is received by the NOC, the NOC automatically matches the received information to information stored at the NOC to determine if a condition exist wherein the user should be automatically notified.

28 Claims, 13 Drawing Sheets

U.S. PATENT DOCUMENTS

| | | | |
|---|---|---|---|
| 4,987,402 A | 1/1991 | Nykerk | 340/426 |
| 5,117,217 A | 5/1992 | Nykerk | 340/426 |
| 5,193,141 A | 3/1993 | Zwern | 395/2 |
| 5,223,844 A * | 6/1993 | Mansell et al. | 342/357.07 |
| 5,245,694 A | 9/1993 | Zwern | 395/2 |
| 5,247,564 A | 9/1993 | Zicker | 379/40 |
| 5,315,285 A | 5/1994 | Nykerk | 340/426 |
| 5,357,560 A | 10/1994 | Nykerk | 379/59 |
| 5,442,553 A | 8/1995 | Parrillo | 364/424.04 |
| 5,513,111 A | 4/1996 | Wortham | |
| 5,532,670 A | 7/1996 | Issa et al. | 340/429 |
| 5,534,845 A | 7/1996 | Issa et al. | 340/425.5 |
| 5,557,254 A | 9/1996 | Johnson et al. | 340/426 |
| 5,629,678 A | 5/1997 | Gargano et al. | |
| 5,646,591 A | 7/1997 | Issa et al. | 340/566 |
| 5,656,997 A | 8/1997 | Hays et al. | 340/566 |
| 5,704,008 A | 12/1997 | Duval, Jr. | 395/2.82 |
| 5,712,638 A | 1/1998 | Issa | 341/176 |
| 5,732,074 A | 3/1998 | Spaur et al. | 370/313 |
| 5,734,981 A | 3/1998 | Kennedy, III et al. | |
| 5,742,666 A * | 4/1998 | Alpert | 379/58 |
| 5,771,455 A | 6/1998 | Kennedy, III et al. | |
| 5,783,989 A | 7/1998 | Issa et al. | 340/426 |
| 5,798,711 A | 8/1998 | Issa et al. | 340/825.31 |
| 5,826,195 A | 10/1998 | Westerlage et al. | |
| 5,832,394 A * | 11/1998 | Wortham | 701/1 |
| 5,850,352 A * | 12/1998 | Moezzi et al. | 345/419 |
| 5,857,967 A * | 1/1999 | Frid et al. | 600/301 |
| 5,870,020 A | 2/1999 | Harrison, Jr. | 340/426 |
| 5,872,519 A | 2/1999 | Issa et al. | 340/825.31 |
| 5,873,043 A | 2/1999 | Comer | |
| 5,874,889 A | 2/1999 | Higdon et al. | 340/426 |
| 5,898,391 A | 4/1999 | Jefferies et al. | |
| 5,900,806 A | 5/1999 | Issa et al. | 340/426 |
| 5,907,195 A | 5/1999 | Issa et al. | 307/10.3 |
| 5,908,383 A * | 6/1999 | Brynjested | 600/300 |
| 5,917,405 A * | 6/1999 | Joao | 340/426 |
| 5,918,180 A * | 6/1999 | Dimino | 455/456 |
| 5,952,933 A | 9/1999 | Issa et al. | 340/825.31 |
| 6,009,330 A | 12/1999 | Kennedy, III et al. | |
| 6,018,657 A | 1/2000 | Kennedy, III et al. | |
| 6,091,957 A * | 7/2000 | Larkins et al. | 455/456 |
| 6,236,332 B1 * | 5/2001 | Conkright et al. | 340/825.06 |
| 6,281,790 B1 * | 8/2001 | Kimmel et al. | 340/506 |
| 6,317,639 B1 * | 11/2001 | Hansen | 700/42 |

OTHER PUBLICATIONS

Internet Resources Group. Daily Monitoring Summaries [online], [retrieved on Oct. 26, 1999]. Retrieved from the Internet <URL:http://www.redalert.com/daily_monitoring_summaries.html>.

Internet Resources Group. Error Notifications [online], [retrieved on Oct. 26, 1999]. Retrieved from the Internet <URL:http://www.redalert.com/error_notifications.html>.

Internet Resources Group. Internet Device Monitoring [online], [retrieved on Oct. 26, 1999]. Retrieved from the Internet <URL:http://www.redalert.com/internet_monitoring.html>.

Teletrac. Teletracer Stolen Vehicle Recovery and Mobile Information System [online], [retrieved on Mar. 17, 1999]. Retrieved from the Internet <URL:http://www.teletrac-online.com/products/htm/teldescr.htm>.

ATX Technologies, Inc. Emergency Services [online], [retrieved on Apr. 17, 1999]. Retrieved from the Internet >URL:http://www.atxtechnologies.com/vehicle/emgcysv-c.asp>.

CUE Corporation –Nationwide Wireless Messaging –Information Services [online], [retrieved on Apr. 10, 2000].

Vetronix Corporation [online], [retrieved on Apr. 10, 2000]. retrieced form the Internet <URL:http://www.bullhornsys.com>.

Skylemetry Wireless Data System [online], [retrieved on Apr. 10, 2000]. Retrieved from the Internet <URL:http://cellemetry.com>.

Cellemetry [online], [retrieved on Jun. 19, 2000]. retrieved from the Intern<URL:http://cellemetry.com>.

OBD II[online], [retrieved on Jun. 15, 2000]. Retrieved form the Internet <URL:http://obd-ii.com/background.html>.

Hewett, Dennis, "Caller–ID Alarm System, " Jan. 2000, Poptronics, pp. 15–22.

Article entitled "Phone a Coke," Electionics/Communications section of Popular Science, Oct. 1999 (1 page).

Datasheet entitled CompuTractor –Tractor Unit Asset Location Systemk, 1998 CompuTracker Corporation, 2 pages).

* cited by examiner

700

| ID NUMBER | CONDITION |
|---|---|
| 0 | Doors Lock/Unlocked |
| 1 | Windows Up/Down |
| 2 | Alarm Arm/Disarm |
| 3 | Sunroof Open/Close |
| 4 | Trunk Open/Close |
| 5 | Lights On/Off |
| 6 | Horn On/Off |
| 7 | Engine |
| 8 | Ignition |
| 9 | GPS Tracking |

| 802 — INTERFACE TYPE | DEVICE — 804 |
|---|---|
| Serial Port | IDB (Doors Lock/Unlocked) |
| Serial Port | IDB (Windows Up/Down) |
| Twist Pair | Alarm Arm/Disarm |
| Serial Port | IDB (Sunroof Open/Close) |
| Serial Port | IDB (Trunk Open/Close) |
| Serial Port | IDB (Lights On/Off) |
| Twist Pair | Horn On/Off |
| Serial Port | ODB (Engine) |
| Serial Port | ODB (Ignition) |
| 806 — Parallel Port | GPS Tracking |
| Twist pair | Misc. — 808 |

IDB = Intelligent Data Bus (devices available)
ODB = On Board Diagnostic (engine functions)

TELEVOKE

Welcome to televoke.net

Device ID#: [        ] —902

Passcode: [        ] —904

ENTER

How to get Televoke?
Support

Copyright © 1999 Televoke, Inc. All rights reserved.

Note: this is a non-public website and is protected by password security. All content at www.televoke.net and its sub directories is proprietary and confidential.

FIG. 9A control page

TELEVOKE

Device ID Number: [12345678(BMW)▼]   Your device is currently: ☑ In Range ☐ Out of Range   Logout

[News] [Notification] [Control] [Tracking] [Billing] [Upgrade] [Support]

Your vehicle has the following control capabilities.
To add more go to the upgrade page.

1   Lock/Unlock Doors    Unlock Now!

2   Arm/Disarm Alarm    Arm Now!

3   Windows Up/Down    Up Now!

4   Light & Horn    Click to Upgrade

5   Start Motor    Click to Upgrade

[News] [Notification] [Control] [Tracking] [Billing] [Upgrade] [Support]
Copyright©1999 Televoke, Inc. All rights reserved.

FIG. 9C

AUTOMATED USER NOTIFICATION SYSTEM

FIELD OF THE INVENTION

This invention relates generally to notification systems, and more particularly, to an automated monitoring system for providing user notification and control of user items.

BACKGROUND OF THE INVENTION

Virtually every item used in daily life incorporates new technology in one form or another. From the simplest consumer products to the most complicated communication systems, new technology provides increased functionality, speed, ease of use and cost efficiency. It is now possible to program home appliances to operate on their own, automatically record television broadcasts or record phone messages when no one is home.

However, even with the most recent improvements in technology, to assure proper operation, people must still personally program and periodically monitor their new equipment. For example, to record a series of future video broadcasts on a video recorder, a person must first program the video recorder with the correct dates and times of the broadcasts. After the programming is complete, the video recorder must be periodically checked to assure proper operation. For example, the user periodically determines that enough recording tape is available, that no jams exist or that the program was not inadvertently erased. Provided the recorder was properly programmed and monitored, the video recorder will record the future broadcasts for later viewing. Thus, new technology has improved people's lives by providing the capability to do something, such as to record future video broadcasts, that at one time was not possible. However, as seen in this simple example, with the benefit of new technology comes a corresponding requirement for people to learn and keep up to date with the latest technological improvements.

In certain circumstances, a user can subscribe to a centralized monitoring service to assist with the operation and monitoring of sophisticated systems. Home security services are just one example of the types of services that are available. Typically these services install and program security devices and have a centralized office, staffed around the clock, to monitor system operation. When a critical situation occurs, such as a burglary, the office staff can detect it and take action to contact the home owner.

However, technology related services, like the security service, are very expensive and can't provide all the flexibility and responsiveness users are looking for. For example, if the homeowner knows of a temporary condition that may provide false information to the service, such as a broken window, it can be difficult to update centralized services with this information. This situation could lead to false alarms because basic operating information is incorrect or there exists some confusion among the security staff. Additionally, it may be inconvenient or difficult for homeowners to update the service with frequently changing contact information. As a result, even if proper detection of an alarm condition occurs, the homeowner cannot be located.

Another problem with centralized monitoring services is that the employees of the service sometimes make mistakes. False alarms can occur when an employee misinterprets information provided by the system. Missed alarm conditions can occur if employees fail to properly monitor the system. Even when alarm conditions are properly detected, an employee may be slow to respond or may otherwise fail to take appropriate action. Thus, existing monitoring services can be unreliable, miss alarm conditions, detect false alarms, fail to notify users and can be difficult to update with the most recent operating information. As a result, people would greatly benefit from improvements in notification systems which can overcome the above problems and provide additional user controllable functionality.

One area where it would be desirable to have improved user notification and control is in vehicle monitoring systems. Motor vehicles are attractive targets for theft and vandalism due to their high value and inherent mobility. The development of motor vehicles has been paralleled by the development of alarm systems to protect them. These alarm systems range from simple steering wheel locks to more sophisticated electronic alarm systems. Typically, vehicle alarms try to prevent unauthorized access to the vehicle or removal of the vehicle without the owner's permission.

A major drawback of many vehicle alarm systems is that the owner may not be alerted to a possible theft until the vehicle has already been taken. Some audible alarm systems provide intrusion alerts to the area immediately surrounding the vehicle, however, the vehicle owner may not be near enough to hear such alerts. In addition, the general public has become so accustomed to hearing these warning sounds that the warnings have lost their effectiveness to deter theft.

Just as in home security systems, expensive centralized services to provide vehicle security are available. In one such service, the owner may report that a vehicle was stolen, at which point, the service activates a location device in an attempt to locate the stolen vehicle. However, the service activation doesn't occur until the owner reports the vehicle as stolen thereby failing to provide real-time monitoring and control capability.

Although notification services, to monitor user items like homes and cars, by provide improvements over simple audible alarms, they are all subject to significant limitations. For example, all the problems discussed above like information updating, operator errors and user interface problems, exist with current notification services. The most significant drawback is that notification services have human operators that are slow and prone to make errors. For example, a monitoring staff employee may be required to look up customer information and manually call any one of several telephone numbers, e.g., home number, work number, cell phone number or pager number to contact the customer. This task may require several minutes to carry out, and in the meantime, a vehicle may be stolen or a home may be vandalized. This delay in an emergency situation is not tolerable. Moreover, a staffed operations center creates a significant cost factor since in addition to the expense of the equipment, office employees are needed around the clock. This situation does not exhibit a positive economy of scale when required to service an increasingly larger customer base.

All these factors combine to show that employee staffed notification services cannot provide a low cost, effective monitoring, notification and control system for a large number of users. What is needed is a low-cost, fully automated notification and control system for providing information about user items. For example, vehicles, homes or office spaces may be examples of user items. The automated system should allow a user to control which specific events or conditions are to be monitored. Indications of the selected conditions should be automatically detected and notification sent to the user without the need of specialized monitoring services usually performed by human operators. A variety of notification devices, such as telephone, facsimile, pager and email should be available to allow users the greatest flexibility when using the system. There should also be user access to the system that allows the user to control and update monitored events, alarm conditions, user notification devices, and contact information.

SUMMARY OF THE INVENTION

The present invention provides an automated user notification system for monitoring user items and notifying a user when selected conditions occur. A first portion of the notification system comprises a network operations center (NOC). The NOC stores user information about one or more user items and is further coupled to a plurality of communication devices that can automatically contact a user. A second portion of the notification system comprises at least one detector. The detector monitors one or more user items and provides information regarding selected conditions of the user items to the NOC via a communication link. When the information is received by the NOC, the NOC automatically matches the received information to information stored at the NOC to determine if a condition exists wherein the user should be automatically notified.

In one embodiment of the invention, a user notification system is provided for automatically providing information to a user regarding a user item. The user notification system comprises a detection module coupled to the user item to determine information about the user item. A first communication module is coupled to the detection module which includes logic for communicating the information over a communication link. The information is received by a second communication module that includes logic for receiving the information over the communication link. A processor is coupled to the second communication module is coupled to at least one user notification device.

In another embodiment of the invention, the user notification system comprises a vehicle alarm system. The vehicle alarm system detects intrusion or attempted burglary of the vehicle and provides immediate notification to the vehicle owner if such a condition exists. The system enables the owner to receive data from the vehicle concerning the cause of alarm actuation and to determine vehicle location, status of airbag deployment, and other vehicle parameters. In addition, the system enables the owner to remotely arm or disarm the vehicle alarm, lock or unlock the vehicle doors, start or stop the vehicle engine, and similar control functions.

In another embodiment of the invention, the user notification system comprises a home alarm system that detects emergency conditions, intrusion or burglary of a user's home. The notification system provides immediate notification to the user of the selected conditions of the user's home. For example, the status of door sensors, window sensors, smoke detectors, fire and flood sensors are detected and any abnormal condition results in immediate notification to the home owner. The system enables the owner to receive status information about any monitored condition through a variety of interfaces such as over the telephone or over a public information network such as the Internet. In addition, the system enables the owner to remotely arm or disarm selected alarm conditions, and active or deactivate home systems such as heating or hot water systems.

BRIEF DESCRIPTION OF THE DRAWINGS

FIG. 7 is a list of detectable conditions in a vehicle monitoring embodiment of the present invention;

FIG. 8 shows an item database for use with a vehicle monitoring embodiment of the present invention; and FIGS. 9A–9E illustrate web pages available for user interaction via the Internet.

DESCRIPTION OF THE SPECIFIC EMBODIMENTS

Figure 1:
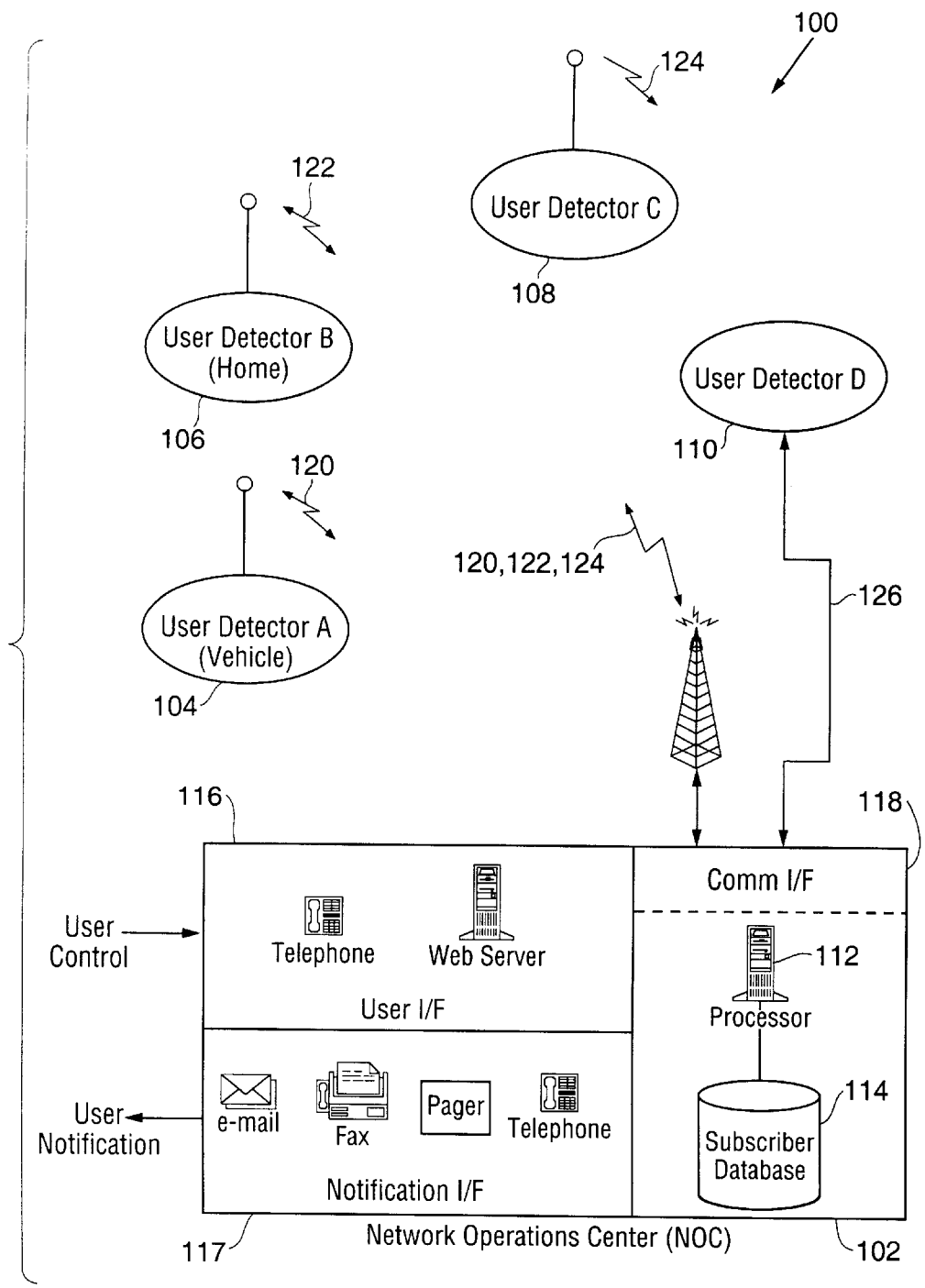
FIG. 1 is a diagram of an embodiment of an automated user notification system 100 in accordance with the present invention.

FIG. 1 is a diagram of an embodiment of an automated user notification system 100 constructed in accordance with the present invention. The user notification system 100 comprises a network operations center (NOC) 102 and user detectors 104, 106, 108 and 110. The NOC 102 comprises a processor 112, a subscriber database 114, a user interface 116, a notification interface 117 and a communication interface 118.

The NOC 102 uses the communication interface 118 to communicate over communication channels 120, 122, 124 and 126 with the user detectors 104, 106, 108 and 110, respectively. The communications channels may be formed of wireless communication channels, such as those used in cellular telephony systems or any other type of wireless communication channel. Alternatively, one or more of the communication channels may comprise a hardwired channel which directly connects a selected detector with the NOC, such as shown by communication channel 126. Although communication channels 120, 122 and 126 depict bi-directional communication between their respective detectors and the NOC, it is possible that a selected communication channel provides only one-way communication to accommodate less sophisticated detectors. As an example, communication channel 124 provides only one-way communication from the detector 108 to the NOC 102.

The notification interface 117 provides for programmable interaction with notification devices such as electronic mail (email), facsimile, pager and standard telephone devices. The notification devices also include connections to public data networks, such as the Internet (not shown). The NOC 102 uses the notification devices to notify users upon detection of specific conditions of user items.

The user interface 116 provides telephone and Internet devices for use by users of the automated system 100. The user interface 116 allows users to access and control the operation of the NOC 102. For example, a user may obtain status information about a user item or may enable and disable controllable features of the user item or the automated system 100 by accessing the system through the user interface 116.

Figure 2:
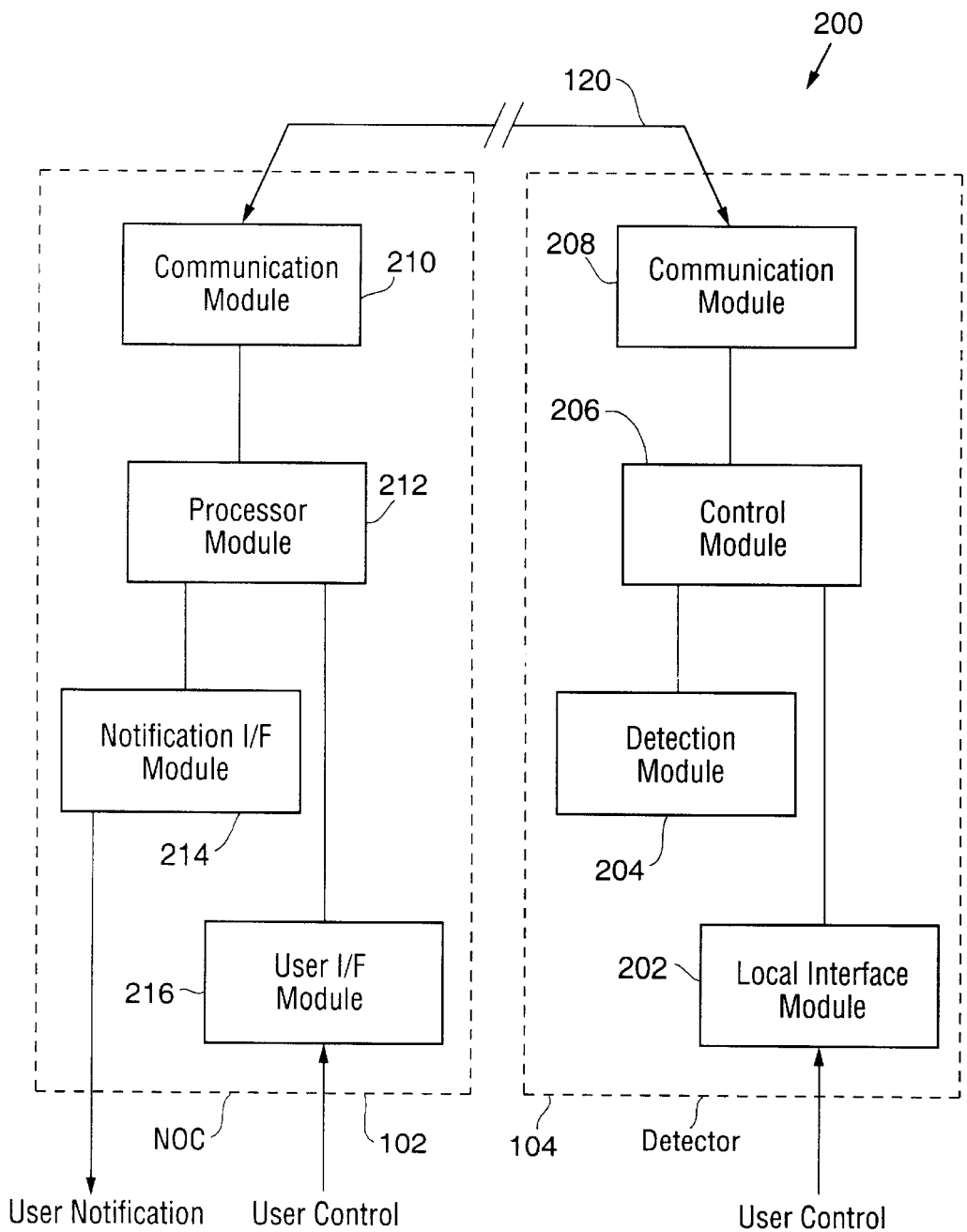
FIG. 2 is a functional block diagram of an operational portion of the user notification system of FIG. 1.

FIG. 2 show a functional block diagram of an operational portion 200 of the user notification system 100 constructed in accordance with the present invention. The operational portion 200 comprises the NOC 102 and the detector 104. Information flows between the NOC 102 and the detector 104 via the communications link 120. The communications link 120 comprises a wireless communications link to form a bi-directional communication channel between the NOC 102 and the detector 104. The wireless communication link 120 may comprise a cellular link, such as used in cellular phone technology, or may comprise any other type of wireless link.

The detector 104 couples to systems and operational elements of the user item to allow monitoring and control of selected conditions and functions applicable to that user item. The detector 104 adapts to couple directly to elements of the user item. For example, if the user item is a vehicle, one of the detected conditions can be the state of the vehicle's ignition switch. The detector 104 also adapts to couple to existing alarm system components. For example, if older or less sophisticated alarm system components are mounted to the user item, the detector 104 adapts to couple to, and operate with, these components. This allows the present invention to utilize existing hardware to provide notification and control features that are unavailable in other systems.

The detector 104 comprises a local interface module 202, a detection module 204, a control module 206 and a communications module 208. The detector's 104 versatile design allows coupling to a variety of user items. For example, the detector 104 could be coupled to a user vehicle, a home, office space or even personal items like a personal computer.

The local interface module 202 is coupled to the control module 206. The local interface module 202 comprises user I/O devices such as a keypad, a visual display, visual indicators and/or audible indicators (not shown). The user interacts with the detector 104 by using the I/O devices, however, as will be shown, the user can also interact with the detector 104 via the NOC 102. By using the I/O devices, the user can manually input information to control the operation of the detector 104, such as enabling or disabling monitoring functions. The local interface module 202 also provides a way for the user to remotely access functions of the NOC 102 via the communication link 120.

The detection module 204 is coupled to the control module 206. The detection module 204 is also coupled to the user item (not shown) to detect a selected condition of the user item. For example, in a vehicle monitoring application, the detection module 204 may detect the state of the vehicle's ignition switch, door locks, transmission or tachometer. The detection module 204 provides information about the detected conditions to the control module 206. The detection module 204 may also couple to currently installed alarm system components of older and less sophisticated systems. This allows the present invention to utilize existing hardware, to reduce costs, while providing notification and control features previously unavailable.

The control module 206 is coupled to the detection module 204, the local interface module 202 and the communication module 208. The control module 206 controls the overall operation of the detector 104. The control module 206 uses parameters received from the communications module 208 or the local interface module 202, to perform various functions, such as configuring the detector 104. The control module 206 receives conditions detected by the detection module 206 and determines what action the detector 104 should take. In one situation, the control module 206 may simply transmit the detected conditions to the NOC 102 via the communications module 208. In another situation, the control module uses the detected conditions to control operation of the user item, such as disabling the vehicle's ignition switch. In this situation, local control of the user item occurs without interaction with the NOC 102. More detail concerning detect conditions in a vehicle monitoring embodiment are discussed in a later section and with reference to FIG. 7.

The communications module 208 is coupled to the control module 206 and the communications link 120. The communications module 208 comprises a transceiver (not shown) to transmit and receive information over the communication link 120. Information received by the communication module 208 over the communication link 120 is directed to the control module 206 to be processed. Processed information from the control module 206 is received by the communications module 208 for transmission over the communications link 120. To accommodate hardwired and wireless communication links, the communications module 208 uses an appropriate transceiver (not shown). For example, if the communication link 120 is a wireless link using cellular telephony technology, the communication module 208 uses a cellular transceiver. Thus, the communication module 208 adapts to operate with any type of link allowing information to flow between the NOC 102 and the detector 104.

The NOC 102 comprises a communications module 210, a processor module 212, a notification I/F module 214 and a user I/F module 216. The NOC 102 provides fully automated user notification based on a determination of selected conditions. The selected conditions may be conditions detected by the detector 104 or may be conditions relating to the operation of the NOC 102. Depending on the type of communication link used, the NOC may be located a great distances from the detector 104 and still provide all the required functionality. For example, using a cellular transmission link, the NOC 102 and the detector 104 may be located virtually anywhere cellular service is available.

The communications module 210 is coupled to the processor module 212 and the communications link 120. The communication module 210 comprises a transceiver (not shown) that sends and receives transmissions over the communications link 120. The communications module 210 of the NOC 102 communicates with all the detectors, namely, 104, 106, 108 and 110, of the notification system 100 regardless of the type of communication link used with each detector. For example, detector 104 uses a wireless communication link and detector 110 uses a hardwired communication link. Thus, the communication module 210 provides the capability to communicate with a number of detectors utilizing different communication technologies.

The processor module 212 is coupled to the communication module 210, the notification I/F module 214 and the user I/F module 216. The processor module 212 processes information received from the detector 104 via the communication module 210 to determine if user notification is required. The processor module 212 comprises storage for pre-stored information relative to all the user items being monitored. The processor module 212 uses the pre-stored information to remotely program detectors, control detector operation and to determine when automatic user notification is required by comparing or matching received information from the detectors to the pre-stored information. The storage also contains user contact information and system operating parameters.

The notification I/F module 214 is coupled to the processor 212 and comprises a number of user notification devices (not shown). Based on instructions received from the processor 212, the notification I/F module 214 uses the notification devices to automatically notify the users of selected conditions regarding user items.

The user I/F module 216 is coupled to the processor module 212 and comprises interactive devices such as a standard telephone device or an Internet device (not shown). The telephone device comprises an automated system that allows users to interact with the NOC 102 to provide user information and control. The Internet device has associated web pages that the user to interact with the NOC 102 over an Internet connection. By using the interactive devices, the user can control operation of the automated system 100, update contact information, change the status of detector modules, change the operating conditions of the user items being monitored or receive status information about specific user items. Interaction between the user and the automated system 100 via the user I/F module 216 is completely automated so that no human operator or customer service personnel is required. The interactive devices allow the user to remotely control selected functions of the automated system 100 and the user item, such as remotely disabling an audible alarm or to remotely lock the vehicle door locks. A more detailed description of the associated web pages is provided in a later section and with reference to FIGS. 9A–9E.

Figure 3:
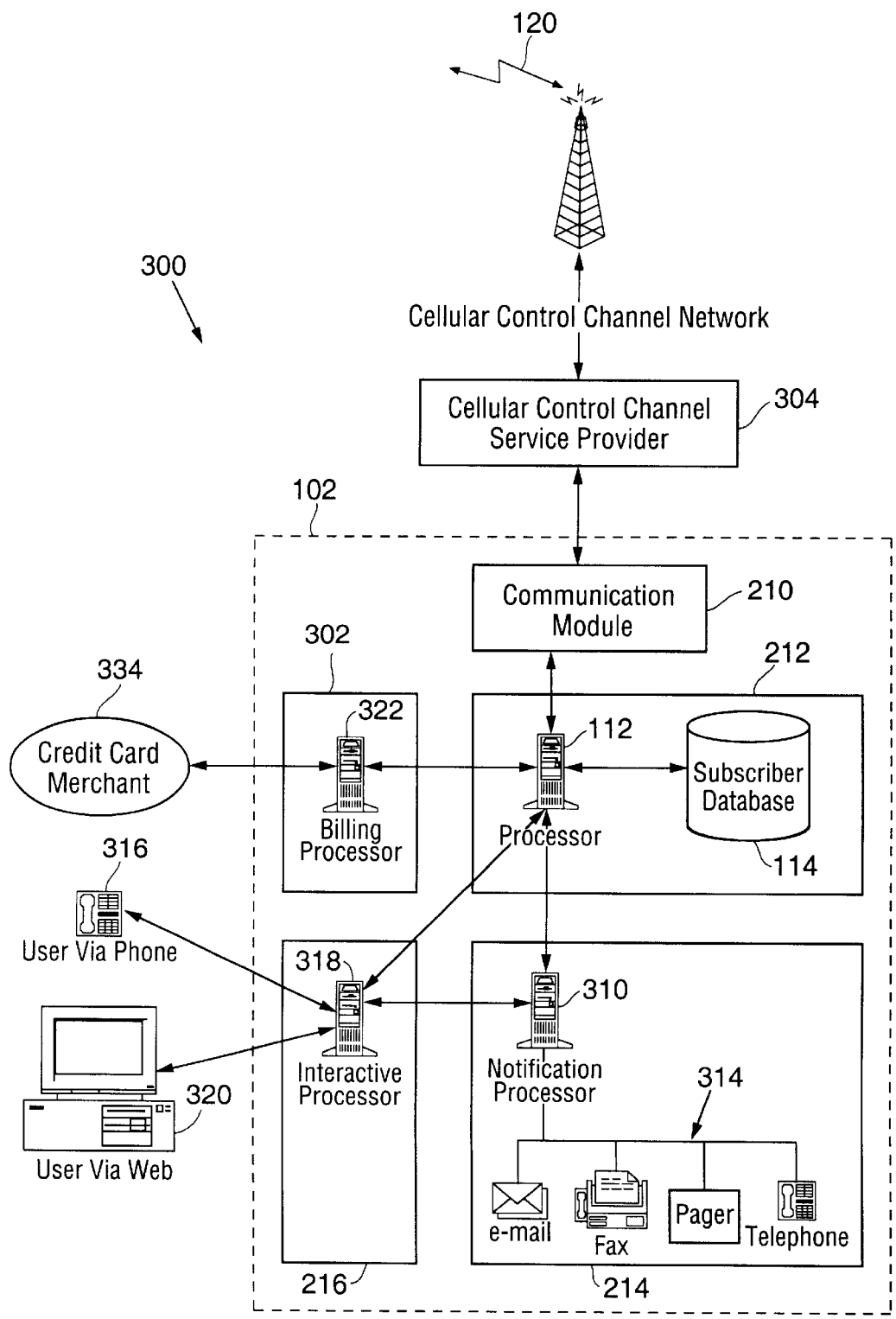
FIG. 3 is a detailed block diagram of the NOC 102 of FIG. 1.

FIG. 3 illustrates a detailed diagram 300 of the NOC 102. Comprising the NOC 102 are the communication module 210, the processor module 212, the notification I/F module 214 and the user I/F module 216. Additionally the NOC 102 may comprise a billing module 302. The NOC 102 is coupled to a cellular service provider 304 which provides the wireless communication link 120 to the detector 104 (not shown). However, the NOC 102 may be coupled to other types of wireless or hardwired service providers.

The processor module 212 comprises the processor 112 and the subscriber database 114. The subscriber database 114 stores information regarding user items, specific monitored conditions, user contact information and other operating parameters. The processor 112 receives information about the status of user items from the communication module 210. The communication module 210 interfaces with the cellular service provider 304 so that information flows between the detector 104 (not shown) and the NOC 102 using the cellular link 120 provided by the cellular service provider 304.

When the processor 112 detects a specific condition about the user item, such as an alarm condition, the processor 112 sends instructions to the notification I/F module 214. The instructions alert the notification module 214 to notify the user about an existing alarm condition. The notification module 214 comprises a notification processor 310 coupled to a plurality of notification devices 314. User contact information is retrieved from the subscriber database 114 and one or more of the notification devices are activated to contact the user.

Once the user has been contacted by the notification I/F module 214 several courses of action are possible. The user may contact the NOC 102 by telephone 316 wherein contact is made via the user I/F module 216. The user I/F module 216 comprises an interactive processor 318 which forms an automated system to accept user queries and commands, so that the user may obtain additional information about the recent alarm condition or control features and functions of the system. The interactive processor 318 interfaces with the processor 112 so that any information available about the status of the user item, stored at the processor 112, may be retrieve by the interactive processor 318 for access by the user. At any time the user may contact the NOC 102 via the user I/F module to control the operation of the NOC 102 or update information parameters. For example, the user may call the NOC 102 by telephone to interact with the user I/F module to enable monitoring of the user's vehicle. Alternatively, the use may contact the NOC 102 via the Internet using the associated Web pages to control operation of the system or access information parameters.

After obtaining the status of the user item the user may provide control instructions to the NOC 102 as to how to handle the existing condition. For example, if the user item is a vehicle that has been placed in operation without the user's consent, the user may instruct the NOC 102 to track the vehicle. Alternatively, the user may instruct the NOC 102 to disable the vehicle or to activate the vehicle's audible alarm.

The user may also update information about the user item and/or the contact information via the interactive processor 318. When user contact or user item information is changed, the interactive processor 318 communicates the new information to the subscriber database 114 via the processor 112. Thus the user may interact with the NOC 102 via an easy and convenient interface to provide control instructions, receive status information or change user parameters or contact information. Additionally, the user may contact the interactive processor 318 via a computer 320 connected to a public information network such as the Internet. All the capabilities of the interactive processor 318 are available to the computer 320 utilizing the public network connection.

As an option to the NOC 102, the billing module 302 includes a billing processor 322 to bill the user for services provided by the automated system 100. Billing may be based on usage, resource utilization, number of contacts in a given period or other measurable billing criteria. The billing processor 322 accesses user information on the subscriber database 114 via the processor 112. Billing may be accomplished in any convenient form and as an example, a credit card merchant process 334 allows services to be billed to the user's credit card on a monthly basis.

Figure 4:
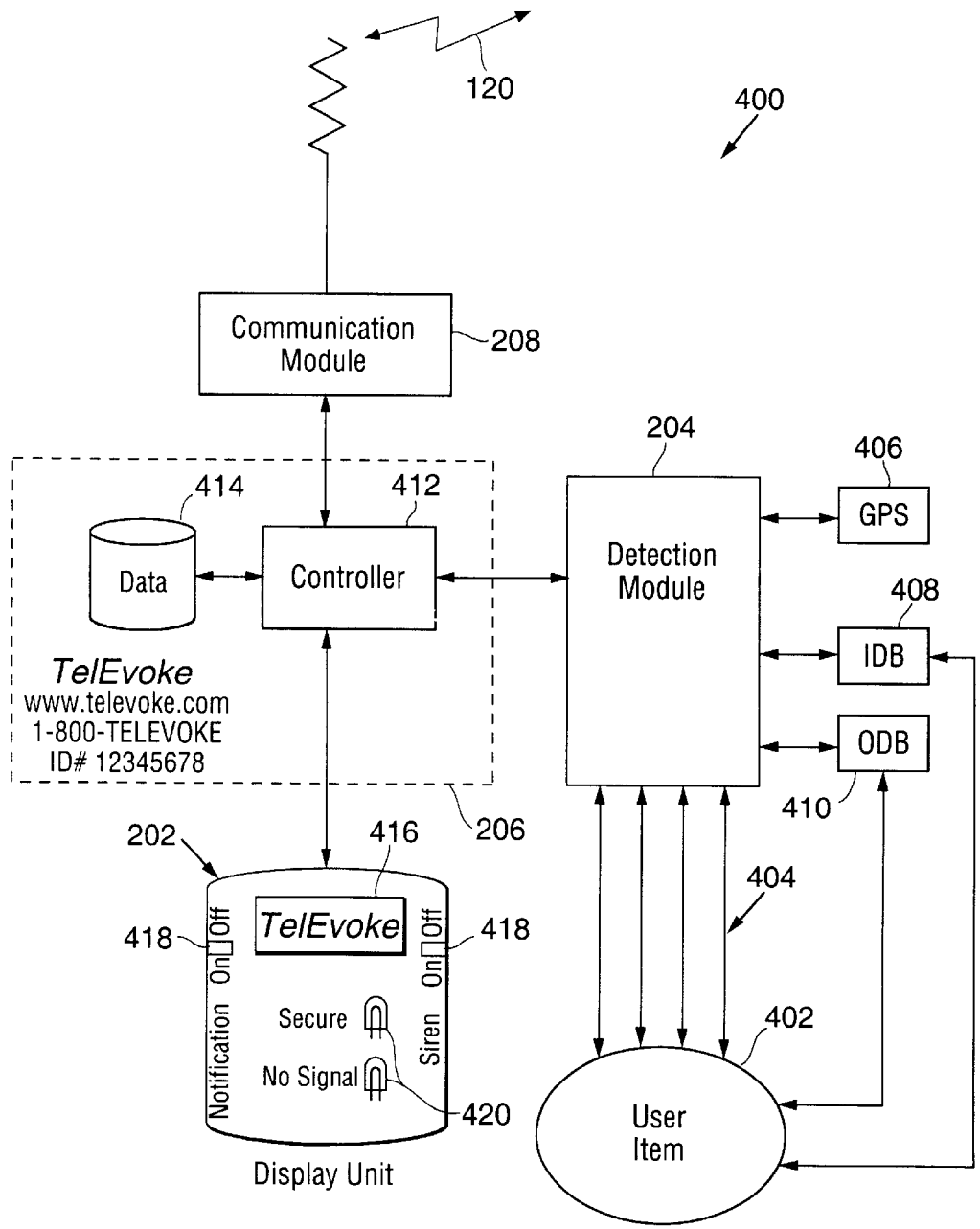
FIG. 4 is a detailed diagram of the detector 104 of FIG. 1.

FIG. 4 illustrates a detailed diagram 400 of the detector 104. The detector 104 comprises the communication module 208, the control module 206, the detection module 204 and the local interface module 202. Also shown in FIG. 4 is a user item 402 which in FIG. 4 is a vehicle but could also be a home, office space or other user item.

The detection module 204 monitors selected parameters of the user item 402. A set of detection lines 404 couple the detection module 204 to the user item 402 and provide information to the detection module 204 about the selected parameters. For example, one of the selected parameters may be the state of the vehicle's ignition switch. When one of the detection lines 404 is coupled to the ignition switch, the detection module 204 is able to detect the ignition switch state.

In another method of obtaining information about a user vehicle, the detection lines 404 connect to existing alarm system components (not shown) from older and less sophisticated alarm systems. These components may already monitor conditions of the user vehicle that are identical to requirements of the present invention. By utilizing existing detection components system costs are reduced while still providing the notification and control features of the present invention. For example, the detection module 204 adapts to couple to an older system component that monitors the state of the vehicle's ignition switch. This eliminates the need for new detection hardware, thereby saving cost, while still providing the ignition switch information for processing by the present invention.

In another method of obtaining information about a user vehicle, the detection lines 404 connect to an Intelligent Data Bus (IDB) 408 installed in the vehicle. The IDB 408 is a peer to peer data network available for use in automotive devices and other ground vehicles. The IDB 408 has access to important vehicle systems, such as the vehicle's electrical system and components, and connecting to it provides the detection module 204 with access to these systems.

In another method of obtaining information about a user vehicle, the detection lines 404 connect to an On-Board Diagnostic (OBD) system 410. The OBD 410 system provides a means to control engine functions and diagnose engine problems. By connecting to the OBD 410 system, the detection module 204 has access to such vehicle parameters as engine operating parameters, emission parameters, chassis and accessory devices.

In another method of obtaining information about a user vehicle, the detection module 204 has plug-in serial and parallel ports to accept a variety of plug-in devices. For example, a Global Positioning System (GPS) module 406 can plug-in or be coupled to the detection module to provide position information about the vehicle to the detection module. By providing a wide range of detection interfaces, such as serial and parallel ports or twisted pair wiring, the detection module 204 allows the detector 104 to connect to, and detect conditions of, a user vehicle or virtually any user item.

The communication module 208 is coupled to the control module 206 and comprises a transceiver (not shown) for transmitting and receiving information with the NOC 102 over the communication link 120. The transceiver may be a wireless transceiver that utilizes a radio communication link or the transceiver may be hardwired to the NOC 102. The transceiver receives information from the NOC 102 regarding parameters to be monitored, status information or other operating information. The communication module 208 sends the received information to the control module 206 for further processing. Any information to be transmitted to the NOC 102 by the communication module 208 will be provided by the control module 206.

The control module 206 couples to the communication module 208, the detector 204 and the local interface module 202. The control module 206 comprises a controller 412 and an item database 414. The item database 414 contains information about the user item to be monitored, status information, operational parameters and other information for use by the controller 412 to perform the detector's 104 functions. A more detailed description of the item database 414 is provided in a later section and with reference to FIG. 8.

The controller 412 receives information from the NOC 102 via the communication module 208 and responds by communicating with the detection module 204 or the local interface module 202. For example, the NOC 102 may request that the detector 104 provide a status of the user item 402. In response, the controller 412 obtains information about the user item 402 from the detection module 204, displays the information using the local interface module 202 and transmits the information to the NOC 102 via the communication module 208. Thus, all manner of detection functions can be accomplished remotely by the NOC 102. In another method of operation, the controller 412 receives information from the detection module 204, and in response, the controller 412 commands the detection module 204 to disable one or more of the user item's resources. This demonstrates local control of the user item by the controller 412. In a similar fashion, instructions for control of the user item may also be received from the NOC 102.

The local interface module 202 couples to the control module 206 and may comprise a text or graphic display 416, a keypad (not shown) or user operable switches 418 and indicator lights 420. The local interface module 202 provides the user a way to locally interact with the detector 104, so that control of the user item and display of status information can be performed. Additionally, the local interface module 202 allows the user to interact with the NOC 102 by, for example, locally entering user item 402 parameters and transmitting the parameters via the control module 206 and communication modules 208 to the NOC 102.

Figure 5:
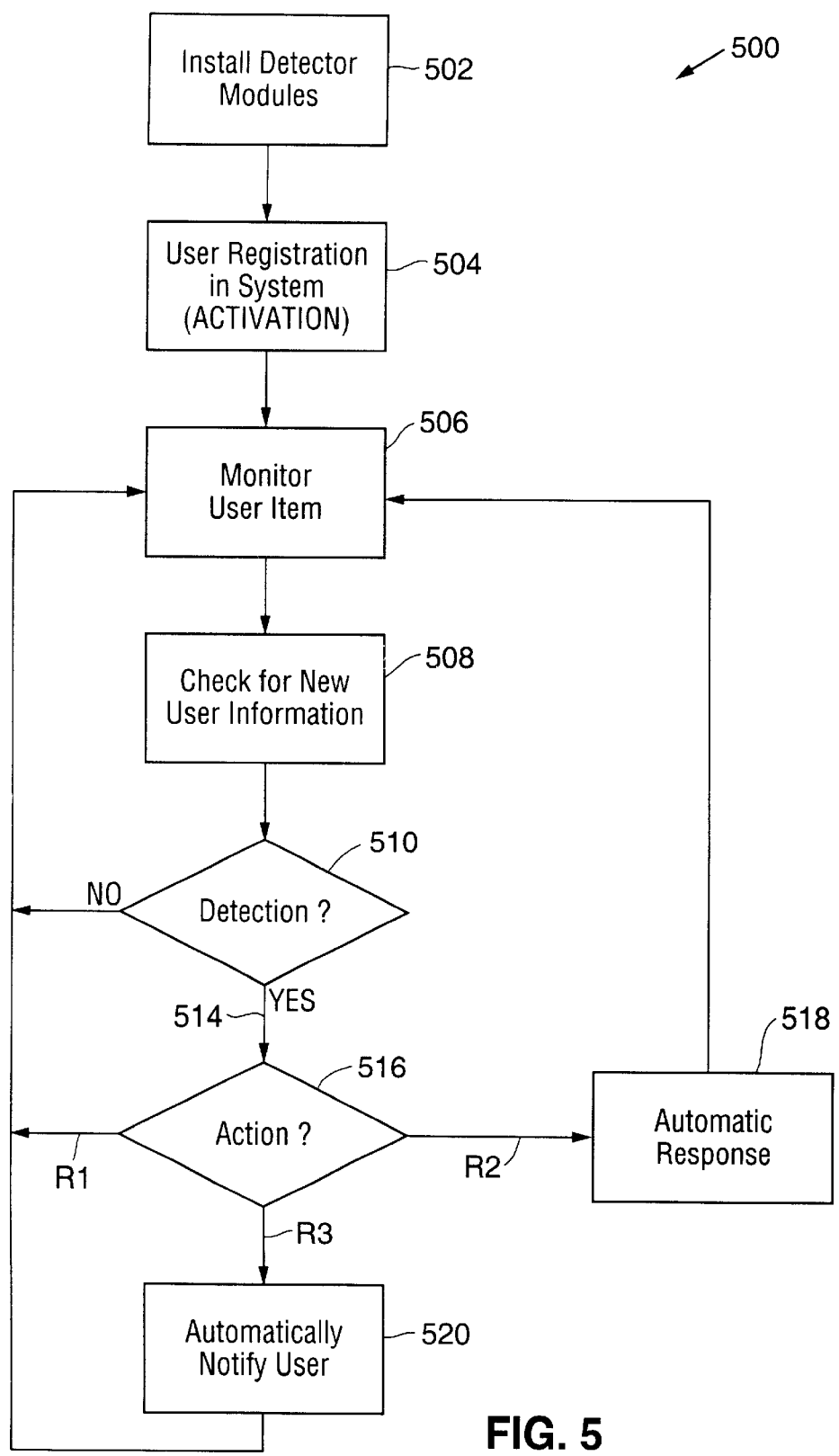
FIG. 5 is a flow diagram which shows a method of operating the automated user notification system of FIG. 1.

FIG. 5 shows a block diagram illustrating a method 500 of operation of the embodiment of the user notification system 100 of FIG. 1. The method begins at block 502 wherein one or more detector modules are coupled to the user items to be monitored. The items to be monitored may be a user's vehicle, home, office or even smaller items such as a home computer or residential safe.

At block 504 a user registration process occurs wherein information about the user and the user items is input into the database 114 of the NOC 102. The information comprises detector parameters regarding the type of detectors used and how they are coupled to the user item, user parameters regarding the user items, and user contact information. Other information may be entered into the database 114 to facilitate other functions, such as invoicing. After the registration process is completed, the user notification system 100 is activated.

At block 506, the user notification system 100 monitors the user items for one or more conditions as specified in the registration process. At block 508, the notification system routinely checks for new user information. For example, the user may activate or deactivate the monitoring process or may update user item status by providing new information concerning a user item, such as, a window is broken but the system is to ignore this condition. By periodically checking for new user information the notification system 100 adapts to changing conditions of either the user items or the user's requirements.

At block 510, the notification system 100 checks for detection of selected monitored conditions of the user items. The detector may periodically transmit status information to the NOC 102 or the NOC 102 may periodically poll the detector to determine the status of the monitored conditions. If none of the monitored conditions exists, then operation of the system proceeds along path 512 to block 506 where monitoring of the user item continues. If a selected monitored condition exists, such as activation of the vehicle's ignition system, then operation of the system proceeds along path 514 to block 516 where the next action will be determined.

At block 516 the detected conditions-are analyzed with regard to information in the database to determine what action the notification system 100 will take. In response one (R1) no action is taken. This response may occur in situations such as in the broken window example above. In this situation the processing of the notification system 100 returns to block 506 to continue to monitor the user items.

Another action that may be taken by the notification system 100 is response two (R2). R2 is an automatic response to the detected condition. At block 518 the automatic response is determined. The automatic response may be something as simple as the NOC 102 logging that the condition has occurred or may entail the NOC 102 directing the detector 104 to take some other action, such as reporting to the NOC another condition, like a current position of the user item. The automatic response may also comprise the NOC 102 commanding the detector 104 to take affirmative action, such as disabling the user item from further operation or activating an alarm indicator. At the completion of the automatic response R2, the operation of the notification system 100 returns to block 506 to continue to monitor the user items.

Another action that may be taken by the notification system 100 is response three (R3). R3 results in an automatic user notification in response to the detected condition. At block 520, the automatic user notification is performed. The NOC 102 uses the information in the database 114 to determine how to contact the user. Attempts to contact the user are made by using the notification devices 314 of the user interface 116. The notification is fully automated, wherein the user is notified with information about the detected condition. If done via telephone, an interactive automated system, such as a voice recognition system or a touch tone system, is used so that once contacted, the user may obtain additional information about the user item. Once notified, by pager for instance, the user may use the interactive system to issue control commands to the NOC 102. For example, the user may command the NOC 102 to disable the user item or to contact the authorities and provide them with location information of the user item. At the completion of the automatic response at block 520, the operation of the notification system 100 returns to block 506 to continue to monitor the user item.

Although one specific method of operation has been provided it will be apparent to those with skill in the art that the responses R1–R3 described with reference to FIG. 5 can be combined and/or re-ordered without deviating from the scope of the present invention and that other responses using other capabilities of the system are possible.

Figure 6:
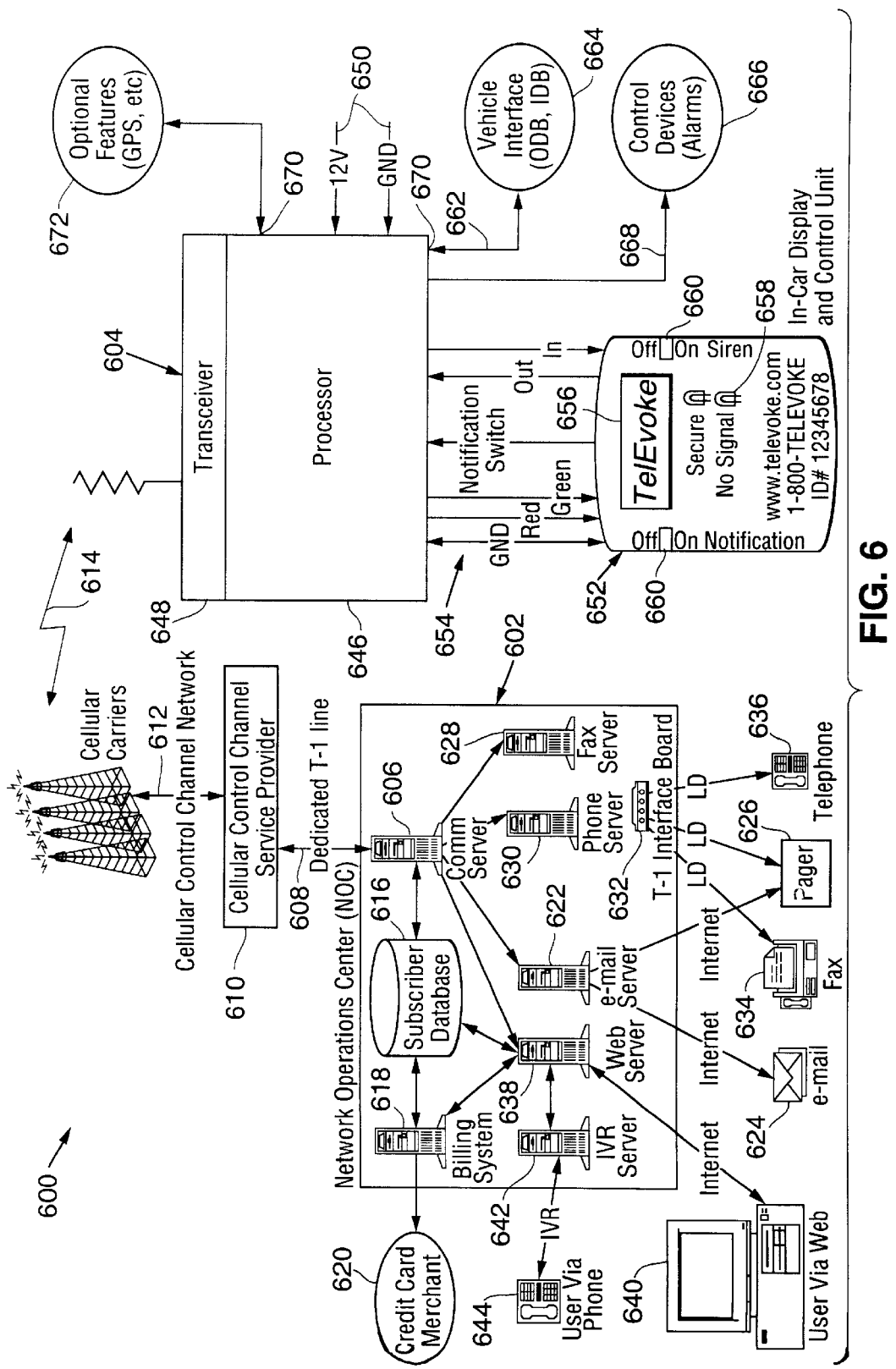
FIG. 6 is a detailed diagram of an embodiment of the present invention used to monitor conditions of a user vehicle.

FIG. 6 shows a detailed embodiment 600 of the present invention used to monitor conditions of a user's vehicle. Embodiment 600 comprises a NOC 602 and a detector 604.

The NOC 602 comprises a number of processors and servers to perform various processing functions and user interface functions. A communication server 606 is shown coupled to a dedicated T-1 line 608 which is further coupled to a cellular control channel service provider 610. The cellular control channel service provider 610 provides access to a cellular control channel network 612. The communication server 606 communicates with the detector 604 over a communications link 614 which is part of the cellular control channel network 612.

The NOC 602 also comprises a subscriber database 616 used to store operating parameters, vehicle information, and user contact information. A billing processor 618 coupled to the subscriber database 616 generate invoices to users based on services rendered by the NOC. For example, a daily fee may be billed. The billing processor has access to a credit card process 620 to directly bill the user's credit card account, however, other types of billing processes, such as simply sending invoices directly to users, are possible.

The communication server 606 is coupled to an email server 622 so that the communication server 606 can notify users of detected conditions using an email process 624 or a pager service 626. The communication server 606 is also coupled to a Fax server 628 and a phone server 630 that are in turn coupled to a Ti interface 632 so that the communication server 606 can contact users with standard Fax 634 and telephone 636 services, or optionally, direct access to the pager service 626.

A Web server 638 provides users a way to interact with the NOC 602 using a standard computer 640 connected to the Internet. The Web server 638 is coupled to the billing system 618, the subscriber database 616 and the communication server 606. Using the connection to the Web server 638, users can control operation of the system, update operating parameters of the user item, change contact information or review user item status. Coupling the billing system 618 to the Web server 638 provides a way to invoice users for services rendered by the NOC 602.

An intelligent voice recognition (IVR) server 642 is coupled to the Web server 638 so that users may interact with the NOC using a standard telephone 644. The IVR 642 comprises a fully automated voice system that provides users access to all the NOC 602 capability in a similar fashion to the Web access available to the computer 640. Thus, the NOC 602 provides a fully functional control and notification system that can automatically notify users via one or more notification devices and also provide users at least two methods of interaction wherein system operation can be controlled or monitored.

The detector 604 is mounted to the user's vehicle to monitor various conditions of the vehicle. For example, monitoring the state of the ignition switch, door locks, and windows will provide information to determine if the vehicle is being stolen or vandalized. Monitoring other states of the vehicle, such as if the airbags have been deployed, provides information to determine if the vehicle has been in an accident. The detector 604 comprises a processor 646 to process vehicle information and a transceiver 648 that allows the detector 604 to communicate with the NOC 602.

Power to the detector 604 is provided by the vehicle's power system as shown at 650 but may also be supplied via a separate battery independent of the vehicle's power system. A local interface module 652 is connected to the processor 646 to allow user interaction with the detector 604. The local interface module 652 can be remotely located from the processor 646 so that, for example, the processor 646 can be mounted in the vehicle's trunk while the local interface module 652 is mounted in the vehicle's passenger compartment. The local interface module 652 is connected to the processor via a number of interface connections 654 so that power and associated control and information signals may flow between the processor 646 and the local interface module 652. The local interface module 652 comprises a display 656 which can display text or graphic information to the user. The are also indicators 658 on the local interface module 652 to provide indications of basic conditions, such as the system is active or that a signal from the NOC 602 is being received.

User input switches 660 provided on the local interface module 652 allow a user to enter local commands to the detector 604. For example, the user may use the input switches 660 to enable and disable the audible alarm feature. Alternatively, a keypad (not shown) could be provided by the local interface module 652 thereby allowing the user to enter more complicated instructions to the detector 604. Additionally, commands entered at the local interface module 652 may flow to the processor 646 and be transmitted by the transceiver 648 to the NOC 602 thus providing the user another way to interact with the NOC 602 to control the operation of the system. In response to a command received from the detector 604, the NOC 602 may transmit information back to the detector 604 which can then be displayed by the local interface module 652.

A set of detector connections 662 monitor the vehicle's condition and connect the processor 646 to various systems and devices 664 of the user's vehicle. For example, the detector connections 662 may connect the processor 646 to the vehicle's ignition switch, battery, door locks, transmission or safety features such as seat belt or air bag systems. This allows the processor 646 to determine operation and conditions of the vehicle while the detector 604 is activated. The processor 646 is further coupled to one or more control devices 666 by control lines 668. When the processor 646 detects one or more alarm conditions, the processor 646 uses the control devices 666 to respond to the condition. For example, if an attempt to steal the vehicle is detected, the processor 646 disables the vehicle ignition system by activating one or more of the control devices 666 via the control lines 668. Additionally, other control devices such as audible or visual alarm devices may be activated by the processor 646 to further protect the vehicle from theft.

The processor 646 has one or more interface ports 670 to connect to external devices 672 such as a GPS receiver or to other information systems, such as an IDB system or an ODB system. The processor 646 interacts with the external devices and systems to obtain information and transmit the information to the NOC 602. For example, positioning information obtained from the GPS can be transmitted to the NOC 602 so that the vehicle's location can be determined.

FIG. 7 shows a list 700 of detectable conditions in a vehicle monitoring embodiment of the present invention. Each condition 702 has an associated ID numbers 704 that can be used to identify the respective vehicle condition. The ID numbers 704 are used by both the NOC and the detector to reference specific monitored conditions. It will be apparent that the list is representative and not intended to show all possible conditions that can be monitored by the embodiments of the present invention.

FIG. 8 shows an item database containing information used to configure a detector to interface with a user vehicle. A detector interface type 802 is associated with a vehicle device 804. For example, the detector's parallel port 806 is associated with a GPS tracking device 808. Many of the vehicle's devices are accessed via internal information systems, such as the Intelligent Data Bus (IDB) system. For example, information about the doors, windows, sunroof and truck can be obtained from the IDB system. The detector associates the item database 800 with the detectable conditions list 700 so that the detector can access the appropriate device to determine selected conditions.

Figure 9B:
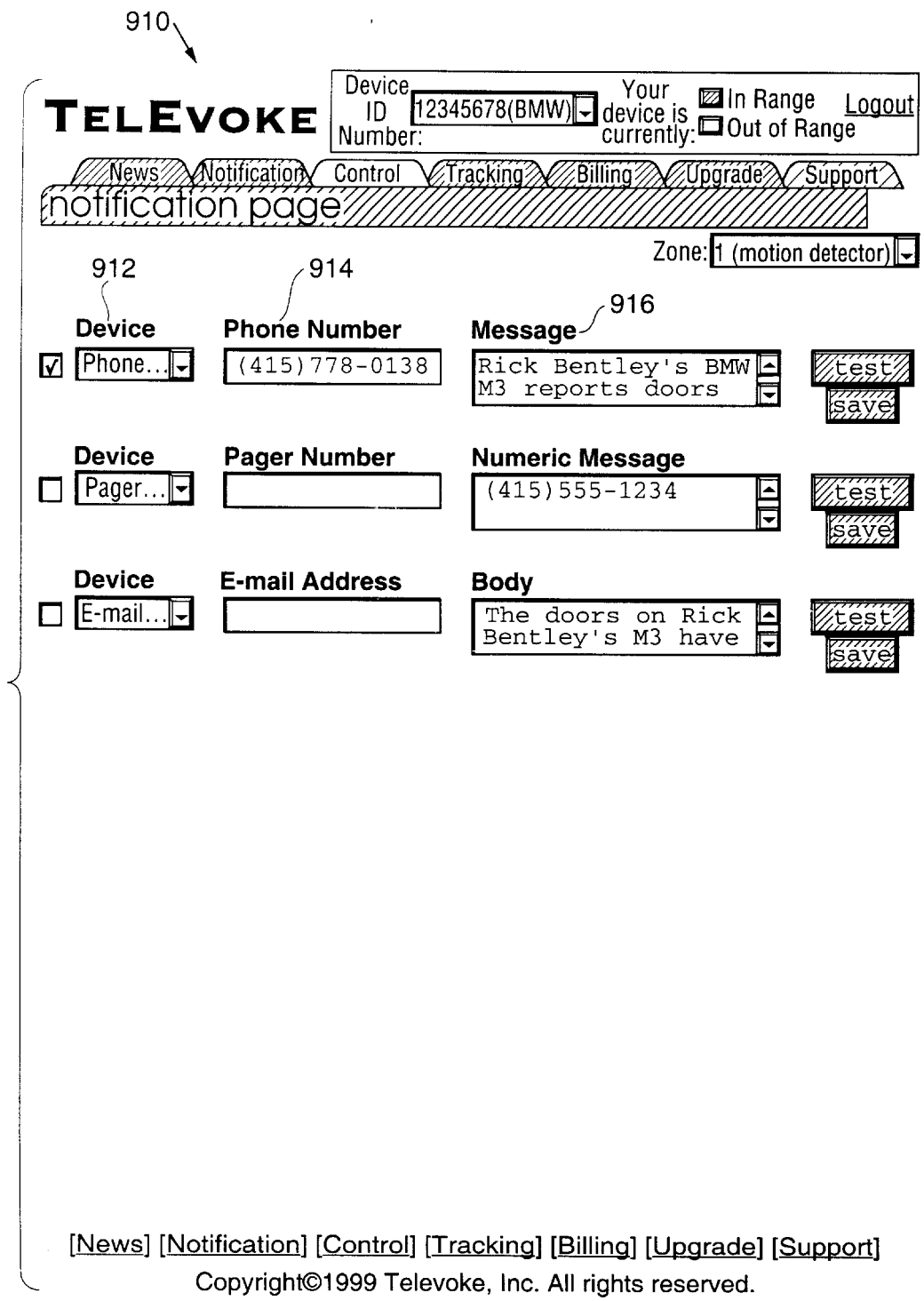

FIGS. 9A–9E illustrate web pages available for user interaction via the Internet. FIG. 9A illustrates a login page 900 where a user enters a device number 902 of the monitored device and a special user passcode 904 for security purposes. FIG. 9B illustrates a notification page 910, where a user can enter various contact information. For example, selection of a communication device 912, contact number 914 and message 916 are possible. FIG. 9C illustrates a control page 920, where the user may control various functions of the user item being monitored. For example, the doors may be locked or unlocked 922 or the windows may be placed up or down 924.

Figure 9D:
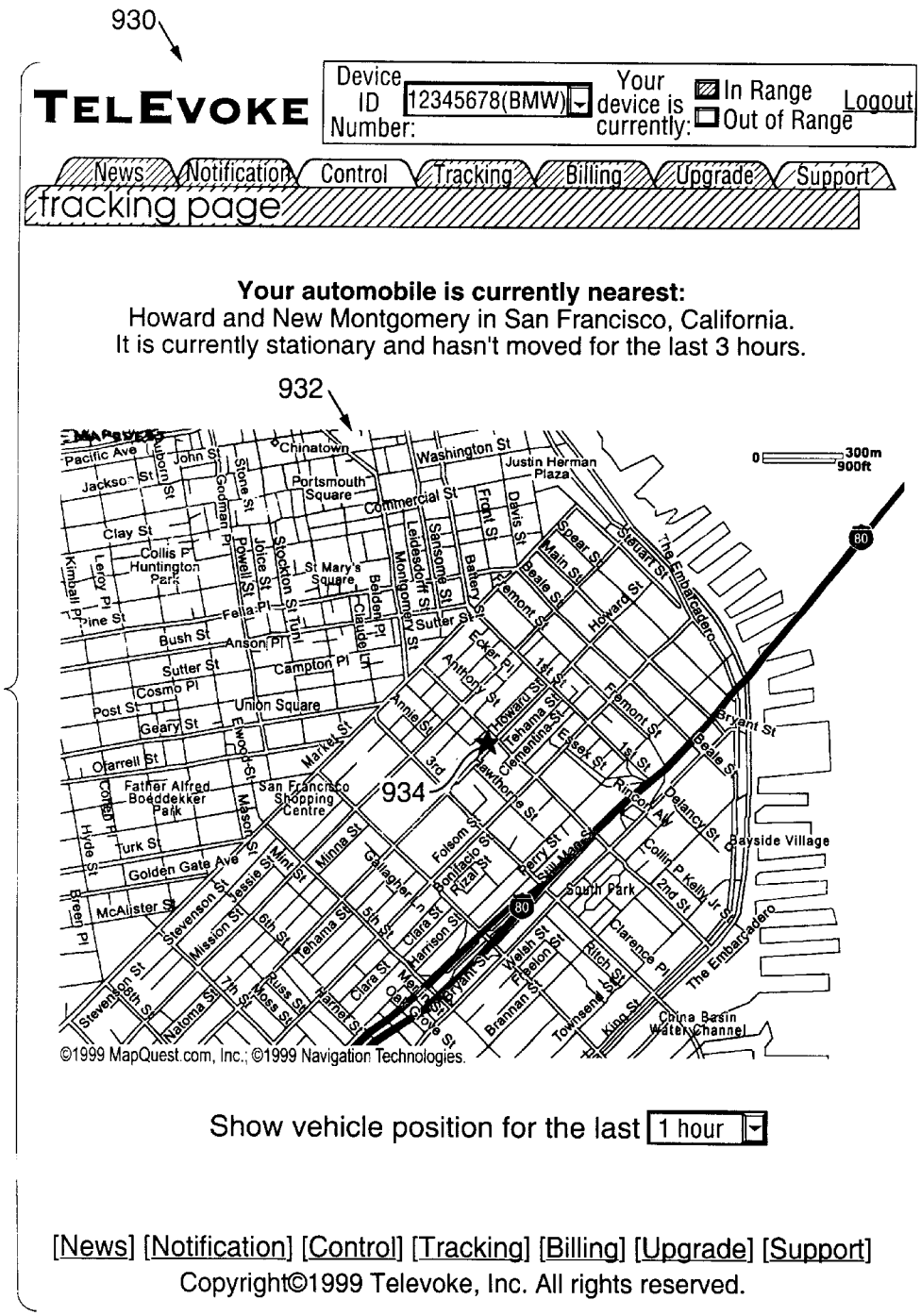
Figure 9E:
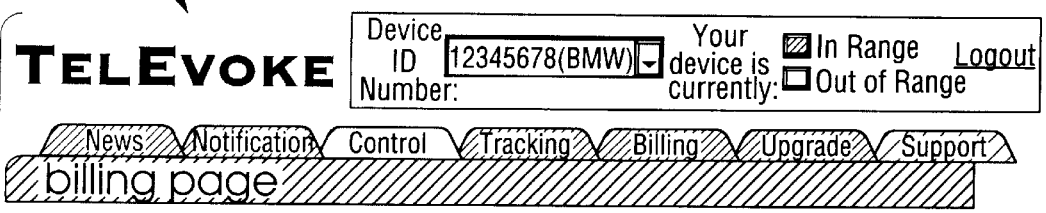

FIG. 9D illustrates a tracking page 930, where the position of a vehicle may be tracked. A map 932 of the region is shown together with an indicator 934 of the vehicle's position. FIG. 9E illustrates a billing page 940, where the user may see charges that have accrued for the services rendered by the automated system 100. For example, specific events are shown at 942 along with an event type 944. The date 946 and the time 948 the event occurred are also shown. The corresponding charges 950 are also shown thereby providing the user with a detailed summary of charges based on system usage.

It will be obvious to those of skill in the art that other web pages are possible for use in interacting with users of the automated system 100 without deviating from the scope of the present invention. For example, web pages which provide user support information or upgrade information are also possible.

As will be understood by those familiar with the art, the present invention may be embodied in other specific forms without departing from the spirit or essential characteristics thereof. Accordingly, the disclosures and descriptions herein are intended to be illustrative, but not limiting, of the scope of the invention which is set forth in the following claims.

What is claimed is:

1. A method of acquiring status information, the method utilizing remote communication between a user and a mobile user object, the method comprising the steps of:

inputting a user initiated status request to an automatic network operations center via a user interface, wherein said user initiated status request corresponds to at least one monitored feature of said mobile user object, and wherein said inputting step occurs on demand;

transmitting said user initiated status request to said automatic network operations center via a first communication link;

receiving said user initiated status request by said automatic network operations center, wherein said receiving step occurs automatically without human intervention;

transmitting said user initiated status request to a control module coupled to said mobile user object via a second communication link, wherein said transmitting said user initiated status request step uses a first communication module coupled to said automatic network operations center and a second communication module coupled to said control module, wherein said mobile user object is one of a plurality of objects coupled to said automatic network operations center, and wherein said user initiated status request transmitting step occurs automatically without human intervention;

polling said mobile user object to determine a status associated with said at least one monitored feature in response to said user status request, wherein said polling step is automatically performed by said control module without human intervention;

transmitting said status associated with said at least one monitored feature to said automatic network operations center via said first and second communication modules and said second communication link, wherein said status transmitting step occurs automatically without human intervention; and notifying said user of said status associated with said at least one monitored feature by said automatic network operations center via a notification interface, wherein said notifying step is performed in accordance with a set of notification instructions stored within said automatic network operations center, wherein said notifying step occurs automatically without human intervention.

2. The method of claim 1, further comprising the steps of:

detecting an event occurrence associated with said mobile user object by a sensor coupled to said mobile user object;

transmitting a notification signal from said control module coupled to said sensor to said automatic network operations center, wherein said notification signal corresponds to said detected event occurrence, wherein said notification signal transmitting step uses said second communication module coupled to said control module;

receiving said notification signal by said first communication module coupled to said automatic network operations center via said second communication link, wherein said notification signal receiving step occurs automatically without human intervention; and notifying said user of said detected event occurrence by said automatic network operations center via said notification interface, wherein said notifying said user of said detected event occurrence step is performed in accordance with said set of notification instructions stored within said automatic network operations center, wherein said notifying step occurs automatically without human intervention.

3. The method of claim 1, further comprising the steps of:

inputting said set of notification instructions to said automatic network operations center via said user interface;

transmitting said set of notification instructions to said automatic network operations center via said first communication link;

receiving said set of notification instructions by said automatic network operations center, wherein said step of receiving said set of notification instructions occurs automatically without human intervention; and storing said set of notification instructions within said automatic network operations center, wherein said storing step is performed automatically by said automatic network operations center without human intervention.

4. The method of claim 1, further comprising the steps of:

inputting a user modification of said set of notification instructions to said automatic network operations center via said user interface;

transmitting said user modification of said set of notification instructions to said automatic network operations center via said first communication link;

receiving said user modification by said automatic network operations center, wherein said user modification receiving step occurs automatically without human intervention; and modifying said set of notification instructions, wherein said modifying step is performed automatically by said automatic network operations center without human intervention.

5. The method of claim 1, further comprising the step of selecting an Internet coupled device as said user interface.

6. The method of claim 1, wherein said set of notification instructions includes at least one instruction pertaining to a category of notification interface to be used by said automatic network operations center.

7. The method of claim 1, wherein said set of notification instructions includes at least one instruction pertaining to user contact information.

8. The method of claim 7, wherein said category of notification interface includes electronic mail, facsimile, paging, and telephone.

9. The method of claim 1, further comprising the step of selecting a bi-directional wireless communication channel as said second communication link.

10. The method of claim 1, further comprising the step of selecting said at least one monitored feature from the group consisting of ignition switch status, door lock status, transmission status, tachometer status, engine operating status, engine emission status, accessory device status, air bag status, and window status.

11. The method of claim 1, further comprising the steps of:

coupling a GPS module to said control module; and selecting a set of position coordinates as said at least one monitored feature.

12. The method of claim 1, further comprising the step of selecting an Internet link as said first communication link.

13. The method of claim 1, further comprising the step of coupling an IDB system to said control module.

14. The method of claim 1, further comprising the step of coupling an OBD system to said control module.

15. A method of remote communication between a user and a mobile user object, the method comprising the steps of:

inputting a user initiated control instruction to an automatic network operations center via a user interface, wherein said user initiated control instruction relates to at least one function associated with said mobile user object, wherein said user interface is separate from and remotely located from said user object, and wherein said automatic network operations center is separate from and remotely located from said mobile user object and said automatic network operations center is separate from and remotely located from said user interface;

transmitting said user initiated control instruction to said automatic network operations center via a first, distance insensitive, communication link;

receiving said user initiated control instruction by said automatic network operations center, wherein said receiving step occurs automatically without human intervention;

processing said user initiated control instruction by said automatic network operations center, wherein said processing step occurs automatically without human intervention;

generating a processed control instruction by said automatic network operations center in response to said user initiated control instruction, wherein said generating step occurs automatically without human intervention;

transmitting said generated, processed control instruction to a control module coupled to said mobile user object via a second, distance insensitive, communication link, wherein said transmitting said generated, processed control instruction step uses a first communication module coupled to said automatic network operations center and a second communication module coupled to said control module, wherein said mobile user object is one of a plurality of objects coupled to said automatic network operations center, wherein said control module is separate from and remotely located from said automatic network operations center, wherein said control instruction transmitting step occurs automatically without human intervention, and wherein said second, distance insensitive, communication link is a wireless link; and controlling said at least one function associated with said mobile user object in response to said generated, processed control instruction and in accordance with said user initiated control instruction, wherein said controlling step is performed automatically by said control module without human intervention.

16. The method of claim 15, further comprising the steps of:

determining a status associated with said at least one function, wherein said status is comprised of an indicator of whether the controlling step has been successfully completed, wherein said control module automatically performs said status determining step without human intervention;

transmitting a status indicator corresponding to said status associated with said at least one function to said automatic network operations center via said first and second communication modules and said second, distance insensitive, communication link, wherein said status indicator transmitting step occurs automatically without human intervention; and notifying said user of said status indicator by said automatic network operations center via a notification interface, wherein said notifying step is performed in accordance with a set of notification instructions stored within said automatic network operations center, wherein said notifying step occurs automatically without human intervention.

17. The method of claim 15, further comprising the steps of:

detecting an event occurrence associated with said mobile user object by a sensor coupled to said user object;

transmitting a notification signal from said control module coupled to said sensor to said automatic network operations center, wherein said notification signal corresponds to said detected event occurrence, wherein said notification signal transmitting step uses said second communication module coupled to said control module;

receiving said notification signal by said first communication module coupled to said automatic network operations center via said second, distance insensitive, communication link, wherein said notification signal receiving step occurs automatically without human intervention; and notifying said user of said detected event occurrence by said automatic network operations center via said notification interface, wherein said notifying said user of said detected event occurrence step is performed in accordance with said set of notification instructions stored within said automatic network operations center, wherein said notifying step occurs automatically without human intervention.

18. The method of claim 15, further comprising the steps of:

inputting said set of notification instructions to said automatic network operations center via said user interface;

transmitting said set of notification instructions to said automatic network operations center via said first, distance insensitive, communication link;

receiving said set of notification instructions by said automatic network operations center, wherein said step of receiving said set of notification instructions occurs automatically without human intervention; and storing said set of notification instructions within said automatic network operations center, wherein said storing step is performed automatically by said automatic network operations center without human intervention.

19. The method of claim 15, further comprising the steps of:

inputting a user modification of said set of notification instructions to said automatic network operations center via said user interface;

transmitting said user modification of said set of notification instructions to said automatic network operations center via said first, distance insensitive, communication link;

receiving said user modification by said automatic network operations center, wherein said user modification receiving step occurs automatically without human intervention; and modifying said set of notification instructions, wherein said modifying step is performed automatically by said automatic network operations center without human intervention.

20. The method of claim 15, further comprising the step of selecting an Internet coupled device as said user interface.

21. The method of claim 15, wherein said set of notification instructions includes at least one instruction pertaining to a category of notification interface to be used by said automatic network operations center.

22. The method of claim 15, wherein said set of notification instructions includes at least one instruction pertaining to user contact information.

23. The method of claim 22, wherein said category of notification interface includes electronic mail, facsimile, paging, and telephone.

24. The method of claim 15, further comprising the step of selecting a bi-directional wireless communication channel as said second, distance insensitive, communication link.

25. The method of claim 15, further comprising the step of selecting said at least one function associated with said mobile user object from the group consisting of ignition switch operation, engine operation, door lock position, and window position.

26. The method of claim 15, further comprising the step of selecting an Internet link as said first, distance insensitive, communication link.

27. The method of claim 15, further comprising the step of coupling an IDB system to said control module.

28. The method of claim 15, further comprising the step of coupling an OBD system to said control module.

* * * * *